UNITED STATES PATENT OFFICE.

FAUSTIN HLAVATI, OF VIENNA, AUSTRIA-HUNGARY.

PROCESS FOR SYNTHETICALLY PREPARING AMMONIA AND OTHER COMPOUNDS CONTAINING NITROGEN AND HYDROGEN.

1,079,705.  Specification of Letters Patent.  Patented Nov. 25, 1913.

No Drawing.  Application filed February 13, 1913.  Serial No. 748,223.

*To all whom it may concern:*

Be it known that I, FAUSTIN HLAVATI, a subject of the Emperor of Austria-Hungary, residing at Vienna, Austria-Hungary, have invented new and useful Improvements in Processes for Synthetically Preparing Ammonia and other Compounds Containing Nitrogen and Hydrogen, of which the following is a specification.

This invention relates to a process for the synthesis of ammonia ($NH_3$), diamid ($N_2H_4$), hydroxylamin ($NH_2OH$) and other compounds containing nitrogen and hydrogen from their elements, which is equally applicable to a pure mixture of 3 parts by volume of pure hydrogen and 1 part by volume of pure nitrogen, or to combustion gases of any furnace plant, or producer- and water-gas in proper proportions as above mentioned, from which gases the carbonic oxid has been separated by cuprous chlorid ($Cu_2Cl_2$) solution. The small quantities of carbon dioxid, methane, oxygen and water which are contained in gas mixtures consisting of 3 parts by volume of hydrogen mixed with 1 part by volume of nitrogen, do not prevent the production of nitrogen hydrogen compounds in this process, if these gas mixtures after having been ionized by electrical means and thereafter sufficiently cooled are conducted over a suitably insulated contact substance consisting of platinum and titanium or palladium and titanium, or of a mixture of a metal or metals belonging to the platinum group with titanium, intimately mixed together, preferably in the ratio of their atomic weights, this mixture being, in a finely distributed condition, precipitated upon in different substances as for instance tuff, asbestos, &c., upon which it is present in the form of firmly adhering metallic pairs.

If apparatus of any construction is at hand, which is capable of withstanding high internal pressure and which for instance contains several tubes or chambers, the same are filled with the contact material, which as above described consists of the finely distributed metals precipitated upon and firmly adhering to an indifferent substance. Through these filled tubes or chambers is conducted a gas mixture ionized as above mentioned by means of electrical influence. This gas mixture however being heated up to about 1000° C. by electrical discharges, has to be gradually cooled down to 450° C., in continuing the process, before entering the first insulated chamber. From this first chamber it enters the second one already considerably cooled down. In its further course it enters a third chamber already cooled down to about 200° C. and is at this temperature eagerly absorbed by the metallic pairs. As heat is given out by the absorption of the gases and the temperature in the chambers rises more and more by means of the supply of fresh hot gases, the absorbed gases are forced to escape from the metallic pairs in the nascent state and to combine to form ammonia (11.8 calories being given off from each gram-molecule of ammonia produced) and the temperature in the apparatus rises gradually to such an extent, that the absorption of the gases is prevented and further ammonia synthesis ceases. To remove this drawback the gases have to be forced into the chambers under a pressure of at least one atmosphere above normal and at the same time the chambers have to be gradually cooled by sprinkling with cold water to such an extent that the temperature in the last chamber sinks to about 60–70° C. As during this process various metallic bases, containing platinum formed in consequence of the oxygen and water contained in the gases as for instance $Pt(NH_3)_2(OH)_2$ and $Pt(NH_3)_4(OH)_2$ (the same as is the case with other metals of the platinum group) the gases must be quickly sucked from the apparatus and passed through acid or water to retain the nitrogen hydrogen compounds. The residual gases escaping from the water or acid are mixed with fresh gas mixture, again ionized and conducted in reverse direction through the contact masses, in order to force the combined ammonia to be given off from the catalysts on account of their high temperature. If two or more sets of apparatus of such construction are at hand through which the ionized gases are always passed alternately in reverse direction while maintaining the requisite temperature, a continuous production of ammonia can be insured.

To avoid the necessity of entirely or at least partly ionizing the gas mixture by electrical discharges, as certain operators would be without the necessary water power for economically producing the requisite electric energy, the process offers to such operators the possibility of cheaply producing ammonia and other nitrogen and hydrogen compounds by means of X-rays (emanation) from pitch blend, mesothorium, or from other radio-active substances easily obtainable. The above mentioned gas mixture of 3 parts by volume of hydrogen and 1 part by volume of nitrogen (the latter also to be obtained from combustion gases and water gas or from producer and water-gas) is forced under two or more atmospheres pressure through catalysts after being excited or rendered active by X-rays (emanation) and further treated as before described.

The greater the pressure upon the gas mixture, the larger is the quantity of ammonia obtainable.

For the sake of making my invention clear, the following specific example is given, but the claims are not to be construed as limited to this particular example. In carrying out my process, I may obtain the nitrogen, by passing the products of combustion of any suitable furnace, such as a steam boiler furnace, which gases contain nitrogen, carbon dioxid, carbon monoxid, together with traces of methane and oxygen, through milk of lime or other suitable absorbent to absorb the carbon dioxid, and then through an alkaline solution of cuprous chlorid, to absorb carbon monoxid. I then add to this purified gas, a sufficient amount of a gas consisting essentially of hydrogen, to produce a gas mixture containing one part by volume of nitrogen to three parts by volume of hydrogen. This mixture is conducted through a vessel in which means are arranged for producing a so called electric brush discharge, whereby the nitrogen and hydrogen molecules are ionized. The ionized gas mixture is then introduced into an apparatus consisting of a plurality of tube-shaped chambers, preferably made of copper and filled with suitable catalytic substances. As a catalyst I preferably employ a mixture of platinum and titanium precipitated in a finely divided condition on a suitable porous substance as for instance porous burnt clay, or asbestos. To produce the catalytic material, I dissolve platinum chlorid and titanium tetrachlorid in very concentrated hydrochloric acid, preferably in about the ratio of the atomic weights of the said metals, that is to say, the final mass should contain 195 parts by weight of platinum and 48 parts of titanium. I then take small pieces of porous clay, or its equivalent, preferably in the form of small balls and I impregnate them with the said hydrochloric acid solution of platinum and titanium chlorids. The mass is dried and the metallic chlorids are then reduced by heating the mass in a current of hydrogen gas. Thereafter the same may be heated in a current of nitrogen or ammonia gas to a temperature of 900–950° C. After being thus treated, the catalyst is filled into said tubes and the above mentioned mixture of nitrogen and hydrogen is conducted through the said tubes containing the contact mass, at least some of said tubes being at a temperature of about 200 to 250° C. Care should be taken that the temperature does not attain 300° at any time in the coolest contact mass. After having passed the catalytic apparatus, the gas mixture, which then contains a certain amount of ammonia (and, which in the presence of water or free oxygen will also contain hydroxylamin) is treated with an acid solution for instance sulfuric acid to absorb the ammonia or other volatile bases. The gas mixture having thus been freed from nitrogen compounds may be reused by conducting it again through the catalytic apparatus.

It may occur that platinum-ammonia compounds such as $Pt(NH_3)_2(OH)_2$ or $Pt(NH_3)_4(OH)_2$ are formed in the catalytic mass especially in the last chambers, where the temperature will usually be much lower than in the first chambers. To decompose the said platinum-ammonia compounds and to regenerate the catalyst the gas current is reversed after some time in the catalytic apparatus and the chambers are heated to 300° C. or over, or the pressure may be reduced for some time, while at a temperature of 200 to 250° C.

The term "a metal of the platinum group" as used in the appended claims is intended to cover a single metal or a mixture or alloy of two or more of such metals.

I claim:—

1. The herein described process of synthetically producing compounds containing nitrogen and hydrogen, which process consists in ionizing a gas mixture containing the said elements and passing the said mixture over a catalyst containing a metal of the platinum group and titanium.

2. The herein described process of synthetically producing compounds containing nitrogen and hydrogen, which process consists in ionizing by electrical discharges a gas mixture containing the said elements and passing the said mixture over a catalyst containing a metal of the platinum group and titanium in the ratio of the atomic weights of the said metals.

3. The herein described process of synthetically producing compounds containing nitrogen and hydrogen, which process includes the steps of passing an ionized gas mixture containing the said elements into contact with metal of the platinum group and titanium, at a range of temperature at which hydrogen is absorbed by the metal of the platinum group, and at which temperature nitrogen is absorbed by titanium, and then raising the temperature to expel the said absorbed elements from the absorbing metals in a chemically active condition, to cause said elements to combine.

4. The herein described process of synthetically producing compounds containing nitrogen and hydrogen, which process consists in ionizing by electrical discharges a gas mixture containing the said elements and passing the said mixture over a plurality of masses of a catalytic body including a metal of the platinum group and titanium, and reversing the direction of the flow of said gas mixture at intervals.

In testimony whereof I affix my signature in presence of two witnesses.

FAUSTIN HLAVATI.

Witnesses:
HENRY HASPER,
WOLDEMAR HAUPT.